(12) United States Patent
Walters et al.

(10) Patent No.: US 11,022,316 B2
(45) Date of Patent: Jun. 1, 2021

(54) KAMADO-STYLE GRILL ASSEMBLIES INCLUDING HEAT SPREADERS AND/OR SUPPORT BRACKETS

(71) Applicant: Phase 2, LLC, St. Louis, MO (US)

(72) Inventors: Jon Scott Walters, St. Louis, MO (US); Fu Du Feng, Taipei (CN)

(73) Assignee: Phase 2, LLC, St. Louis, MO (US)

( * ) Notice: Subject to any disclaimer, the term of this patent is extended or adjusted under 35 U.S.C. 154(b) by 0 days.

(21) Appl. No.: 15/428,717

(22) Filed: Feb. 9, 2017

(65) Prior Publication Data

US 2017/0336076 A1    Nov. 23, 2017

Related U.S. Application Data

(60) Provisional application No. 62/338,196, filed on May 18, 2016.

(51) Int. Cl.
*A47J 37/07* (2006.01)
*F24C 3/02* (2006.01)
(Continued)

(52) U.S. Cl.
CPC ........... *F24C 3/025* (2013.01); *A47J 37/0704* (2013.01); *A47J 37/0786* (2013.01); *F24C 3/045* (2013.01); *F24C 3/14* (2013.01)

(58) Field of Classification Search
CPC ....................................................... A47J 37/07
(Continued)

(56) References Cited

U.S. PATENT DOCUMENTS 1,553,751 A * 9/1925 Cooke .................. A47J 37/06
126/14
1,939,941 A * 12/1933 Ahern .................. F23D 14/04
431/201
(Continued)

FOREIGN PATENT DOCUMENTS

| CN | 204889699 U | 12/2015 |
|---|---|---|
| KR | 20-0179509 Y1 | 4/2000 |
| WO | WO-2013116946 A1 | 8/2013 |

OTHER PUBLICATIONS

Extended European Search Report issued for EP17800169.9 dated Nov. 21, 2019, 12 pages.
(Continued)

*Primary Examiner* — Avinash A Savani
(74) *Attorney, Agent, or Firm* — Lewis Rice LLC

(57) ABSTRACT

A kamado-style grill assembly includes a vessel, a fire bowl, and a unit extending through an opening of the vessel for positioning below an opening of the fire bowl. The unit may include a gas burner configured to radiate heat into the fire bowl. In such examples, the grill assembly may further include a heat spreader removably coupled to the unit The heat spreader is formed at least partially of a thermally conductive material to absorb heat radiated from the gas burner and spread heat away from the gas burner. In other examples, the grill assembly may additionally and/or alternatively include a support bracket removably coupled to the fire bowl. The support bracket extends across at least a portion of an opening of the fire bowl for supporting a structure. Other example kamado-style grill assemblies and methods of installing components of kamado-style grills are also disclosed.

25 Claims, 11 Drawing Sheets

(51) Int. Cl.
*F24C 3/14* (2006.01)
*F24C 3/04* (2006.01)

(58) Field of Classification Search
USPC .................................... 126/25 R, 25 B, 9 R
See application file for complete search history.

(56) References Cited

U.S. PATENT DOCUMENTS

| | | | | |
|---|---|---|---|---|
| 2,252,182 | A * | 8/1941 | Kahn | F23D 5/00 431/340 |
| 3,667,449 | A * | 6/1972 | Persinger | A47J 37/0713 126/25 R |
| 3,785,361 | A * | 1/1974 | Mejyr | A47J 37/0713 126/25 R |
| 4,334,462 | A * | 6/1982 | Hefling | A47J 37/0713 126/25 R |
| 4,542,733 | A * | 9/1985 | Chan | A47J 37/0713 126/25 R |
| 4,788,962 | A * | 12/1988 | Mashburn | A47J 37/0713 126/25 R |
| 9,237,828 | B2 | 1/2016 | Walters et al. | |
| 2009/0004348 | A1* | 1/2009 | Silva | A23B 4/044 426/315 |
| 2009/0308373 | A1 | 12/2009 | Scott et al. | |
| 2011/0214662 | A1 | 9/2011 | Contarino, Jr. | |
| 2011/0283990 | A1* | 11/2011 | Walters | A47J 37/0704 126/25 R |
| 2014/0261015 | A1 | 9/2014 | Nelson | |

OTHER PUBLICATIONS

Monolith Grill, Classic Junior Le Chef, accessed on Nov. 13, 2019 from https://living-exclusive.de/images/produkte/monolith-grill/pdf/MONOLITH-Hauptkatalog-2016.pdf, 30 pages.

* cited by examiner

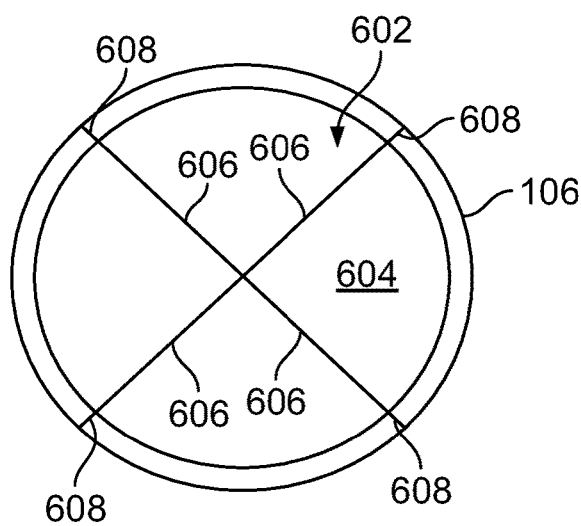
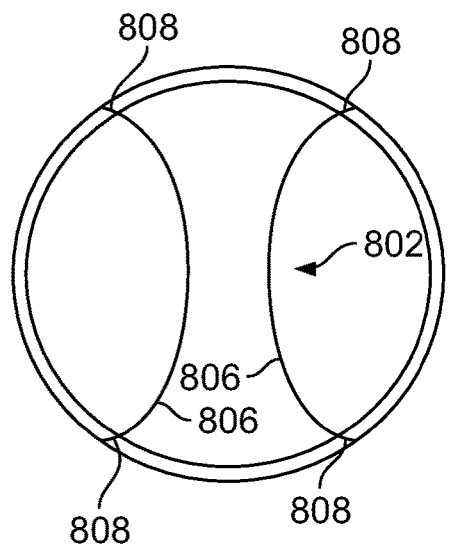
FIG. 7    FIG. 8
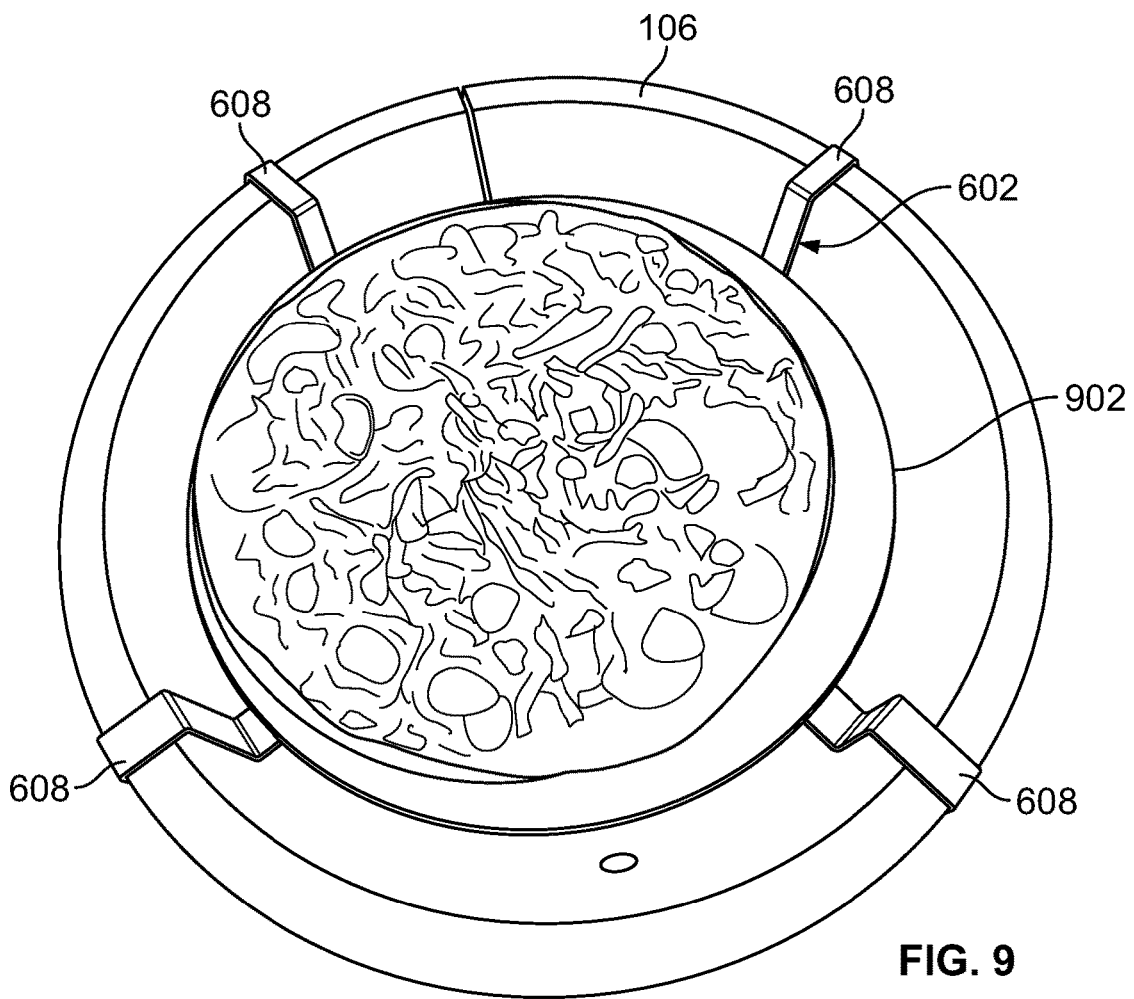
FIG. 9

KAMADO-STYLE GRILL ASSEMBLIES INCLUDING HEAT SPREADERS AND/OR SUPPORT BRACKETS

CROSS-REFERENCE TO RELATED APPLICATION

This application claims the benefit and priority of U.S. Provisional Application No. 62/338,196 filed May 18, 2016. The entire disclosure of the above application is incorporated herein by reference.

FIELD

The present disclosure relates to kamado-style grills assemblies including heat spreaders and/or support brackets.

BACKGROUND

This section provides background information related to the present disclosure which is not necessarily prior art.

Grills include different components for cooking various types of food. For example, gas grills include gas burners to cook food. In some gas grills, the gas burner may be at least partially removed from the grill to ignite the gas. Charcoal grills such as steel charcoal grills and kamado-style grills utilize charcoal to cook food. In some charcoal grills, a removable ash collector may be positioned in the grill to collect ash from the charcoal.

SUMMARY

This section provides a general summary of the disclosure, and is not a comprehensive disclosure of its full scope or all of its features.

According to one aspect of the present disclosure, a grill assembly includes a vessel defining an opening extending between an interior of the vessel and an exterior of the vessel, a fire bowl removably positioned within the vessel and defining an opening extending between an interior of the fire bowl and an exterior of the fire bowl, a unit extending through the opening of the vessel for positioning below the opening of the fire bowl, and a heat spreader removably coupled to the unit. The unit includes a gas burner configured to radiate heat into the fire bowl. The heat spreader is formed at least partially of a thermally conductive material to absorb heat radiated from the gas burner and spread heat away from the gas burner. The grill assembly is a kamado-style grill.

According to another aspect of the present disclosure, a grill assembly includes a vessel defining an opening extending between an interior of the vessel and an exterior of the vessel, a fire bowl removably positioned within the vessel and defining two openings both extending between an interior of the fire bowl and an exterior of the fire bowl, a unit extending through the opening of the vessel for positioning below one of the openings of the fire bowl, and at least one support bracket removably coupled to the fire bowl. The support bracket extends across at least a portion of the other opening of the fire bowl for supporting a structure. The grill assembly is a kamado-style grill.

According to yet another aspect of the present disclosure a method of installing a heat spreader in a kamado-style grill is disclosed. The kamado-style grill includes a vessel and a fire bowl removably positioned within the vessel. The method includes removably coupling a heat spreader to a unit including a gas burner positioned below an opening of the fire bowl.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a top view of the support bracket of FIG. 6.

FIG. 8 is a top view of a support bracket including two nonintersecting cross beams according to another example embodiment.

FIG. 9 is a perspective view of the support bracket of FIG. 6 supporting a structure according to yet another example embodiment.

Corresponding reference numerals indicate corresponding parts or features throughout the several views of the drawings.

DETAILED DESCRIPTION

Figure 1:
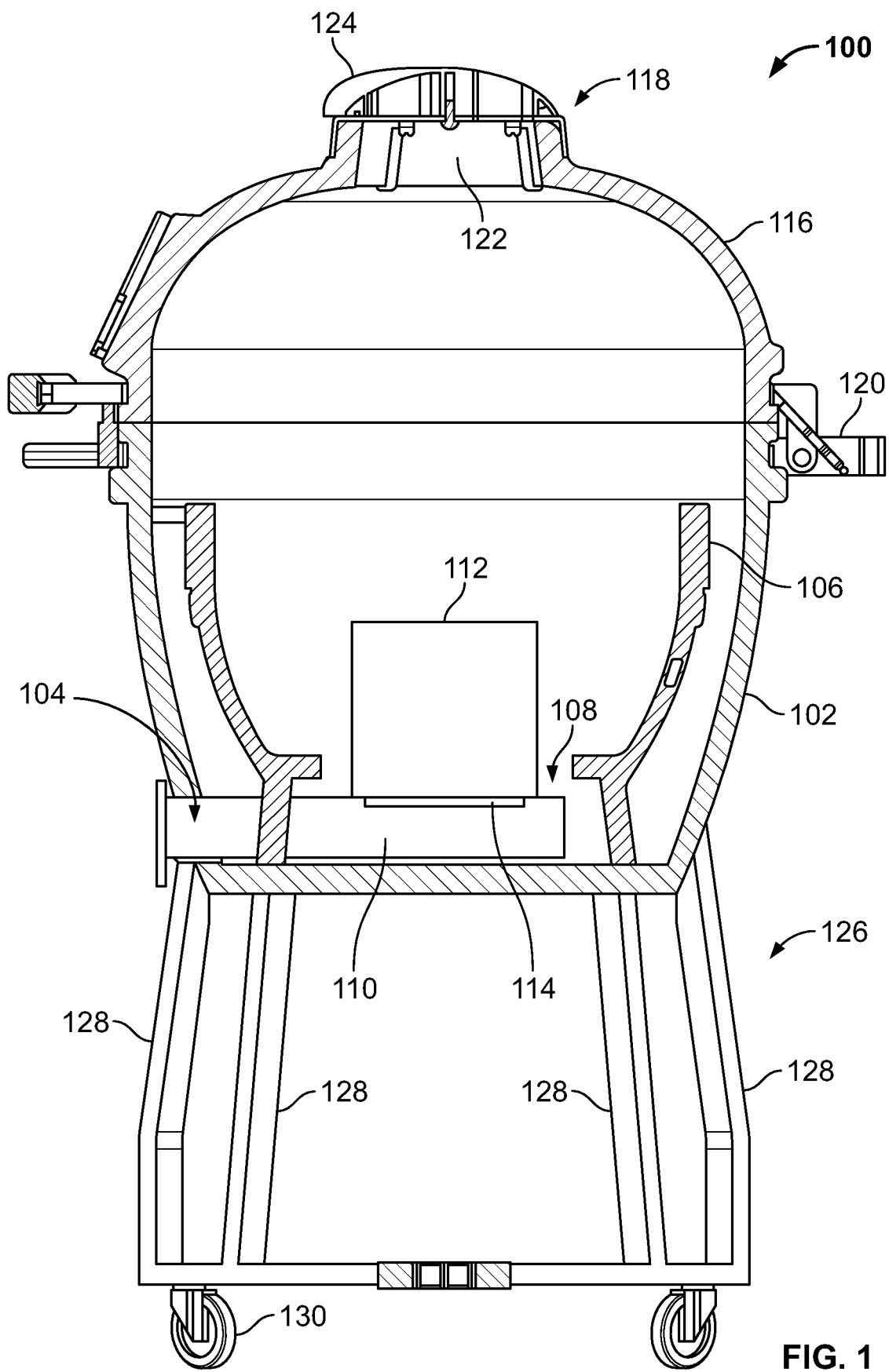
FIG. 1 is a cross sectional side view of a kamado-style grill including a unit extending through a vessel opening and a heat spreader removably coupled to the unit according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A kamado-style grill assembly according to one example embodiment of the present disclosure is illustrated in FIG. 1 and indicated generally by reference number 100. As shown in FIG. 1, the kamado-style grill assembly 100 (sometimes referred to herein as the grill 100, the kamado-style grill 100, etc.) includes a vessel 102 defining an opening 104 extending between an interior of the vessel 102 and an exterior of the vessel 102, a fire bowl 106 removably positioned within the vessel 102 and defining an opening 108 extending between an interior of the fire bowl 106 and an exterior of the fire bowl 106, a unit 110 extending through the opening 104 of the vessel 102 for positioning below the opening 108 of the fire bowl 106, and a heat spreader 112 removably coupled to the unit 110. The unit 110 (sometimes referred to as a gas unit 110) includes a gas burner 114 configured to radiate heat into the fire bowl 106.

The heat spreader 112 is formed at least partially of a thermally conductive material to absorb heat radiated from the gas burner 114 of the gas unit 110 and spread heat away from the gas burner. Thus, the heat spreader 112 and/or the other heat spreaders disclosed herein transfer heat from one area (e.g., adjacent the burner 114) to another area. As such, the heat spreader 112 and/or the other heat spreaders disclosed herein may be considered heat exchangers.

The heat spreader 112 may allow heat to spread throughout the kamado-style grill 100. For example, if the heat spreader 112 is employed as in FIG. 1, heat normally concentrated substantially above the gas burner 114 can be spread via the heat spreader 112 to areas near the perimeter of the fire bowl 106. This allows for a more uniform temperature (and in some cases a uniform temperature) throughout the grill, including a cooking surface of the grill, compared to other grills not including a heat spreader. As such, users may experience better cooking results when using the kamado-style grill 100.

The thermally conductive material may include, for example, one or more metallic materials such as iron, aluminum, copper, steel, etc. and/or alloys thereof. In some embodiments, the thermally conductive material includes stainless steel such as 304 stainless steel, etc. Additionally and/or alternatively, the thermally conductive material may include other suitable materials such as ceramic materials, carbon based materials, etc.

Figure 2:
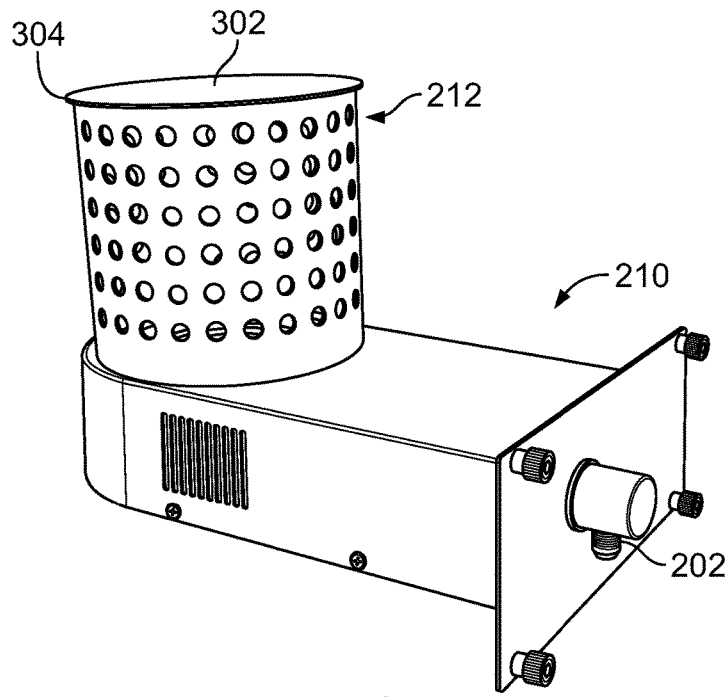
FIG. 2 is a perspective view of a removable unit and a heat spreader including perforations according to another example embodiment.

As explained above, the heat spreader 112 is removably coupled to the gas unit 110. For example, and as shown in FIGS. 1 and 2, the heat spreader 112 can rest on top of the gas unit 110. In other embodiments, the heat spreader 112 can be removably coupled to the gas unit 110 via one or more mechanical fasteners (e.g., screws, clamps, bolts, nuts, etc.), adhesives, etc.

Preferably, and as shown in FIG. 1, the heat spreader 112 substantially aligns with the gas burner 114 when the heat spreader 112 is coupled to the gas unit 110. This allows the heat spreader 112 to substantially shield the gas burner 114 from undesirable materials such as objects falling from above the gas unit 110 (e.g., grease, dirt, etc.). As such, the heat spreader 112 may protect the gas burner 114 from the undesirable materials that may otherwise disrupt and sometimes damage the gas burner. In other embodiments, the heat spreader 112 may be offset from the gas burner 114 when the heat spreader 112 is coupled to the gas unit 110. For example, the heat spreader 112 may overlay about half the gas burner 114 or another suitable amount if desired.

The unit 110 may be attached to the grill 100 if desired. For example, the unit 110 may be coupled to the fire bowl 106, the vessel 102 and/or another component of the grill via one or more mechanical fasteners, adhesives, etc.

In other embodiments, the unit 110 may be a removable unit. For example, the removable unit 110 may be one of various different units insertable through the opening 104 of the vessel 102. In such examples, the opening 104 of the vessel 102 may be configured to receive another removable unit when the removable gas unit 110 is removed from the vessel 102. As such, the kamado-style grill 100 can operate as a gas fired grill when the removable gas unit 110 is inserted in the opening 104 of the vessel 102 and a charcoal fired grill, for example, when another removable unit is inserted in the opening 104 of the vessel 102.

For example, a user can remove a removable charcoal unit from the vessel opening 104 (if previously installed) and insert (e.g. slide, etc.) the removable gas unit 110 in the vessel opening 104 such that the gas burner 114 is positioned substantially below the fire bowl opening 108. After which, the user can place the heat spreader 112 on top of the gas burner 114 via the fire bowl opening 108, and optionally attach the heat spreader 112 to the removable gas unit 110 (e.g., with clamps, adhesives, etc.), as explained above.

Figure 3:
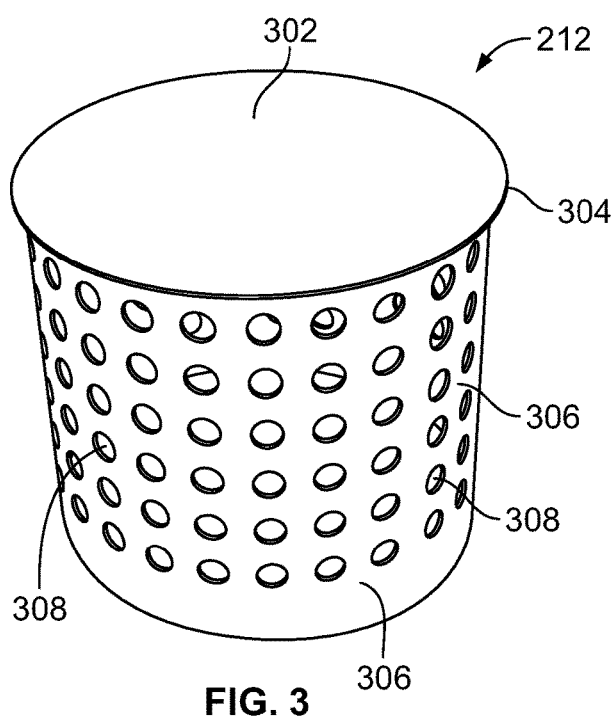
FIG. 3 is a perspective view of the heat spreader of FIG. 2.

FIGS. 2 and 3 illustrate an example heat spreader 212 and/or an example removable gas unit 210, each of which may be employed in the kamado-style grill 100 of FIG. 1 and/or another suitable grill such as those disclosed herein. As shown in FIG. 2, the removable gas unit 210 includes an input 202 (sometimes called an input gas port) for receiving flammable gas as further explained below.

The heat spreader 212 of FIGS. 2 and 3 includes a top surface 302 defining a perimeter 304 and a side surface 306 extending from the top surface 302. The top surface 302 includes a solid surface. This allows the top surface 302 of the heat spreader 212 to shield a gas burner of the unit 210 and/or another suitable unit (e.g., the unit 110 of FIG. 1) from undesirable materials, as explained above.

As shown best in FIG. 3, the side surface 306 extends from the top surface 302 on an interior side of the perimeter 304. Put another way, the top surface 302 extends beyond an edge of the side surface 306. This arrangement between the top surface 302 and the side surface 306 helps shield the gas burner from undesirable materials as explained above. Alternatively, the side surface 306 may extend from the top surface 302 at the perimeter 304 if desired.

As shown in FIGS. 2 and 3, the side surface 306 may define one or more perforations 308 to allow air to flow through the heat spreader 212. By allowing air to flow through the heat spreader, heat may spread throughout a grill (e.g., the kamado-style grill 100 of FIG. 1 and/or another suitable grill) more efficiently than with other employable heat spreaders without perforations (as further explained below).

The perforations 308 may be uniformly positioned about the heat spreader 212 as shown in FIGS. 2 and 3, or alternatively randomly positioned if desired. The perforations 308 may be circular shaped (as in FIGS. 2 and 3) and/or another suitable shape such as triangular, oval, rectangular, etc. Additionally, although the perforations 308 are uniform in size, it should be understood that the heat spreader 212 may include various sized perforations.

As shown best in FIG. 3, the heat spreader 212 is substantially cylindrical. This allows the heat spreader 212 to substantially align with a substantially circular gas burner (not shown) without wasting heat spreader material. Alternatively, the heat spreader 212 may have another suitable shape. In such cases, the shape (e.g., the cross sectional shape) of a particular heat spreader may be similar as or different than the shape (e.g., the cross sectional shape) of its corresponding gas burner.

Figure 4:
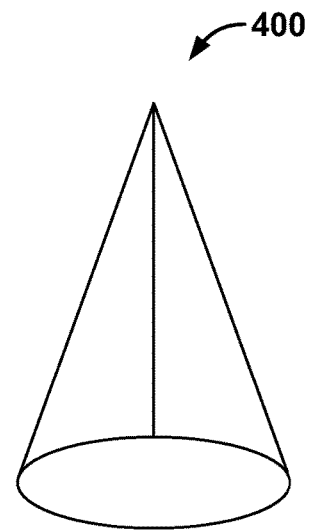
FIG. 4 is a perspective view of a conical shaped heat spreader according to another example embodiment.
Figure 5:
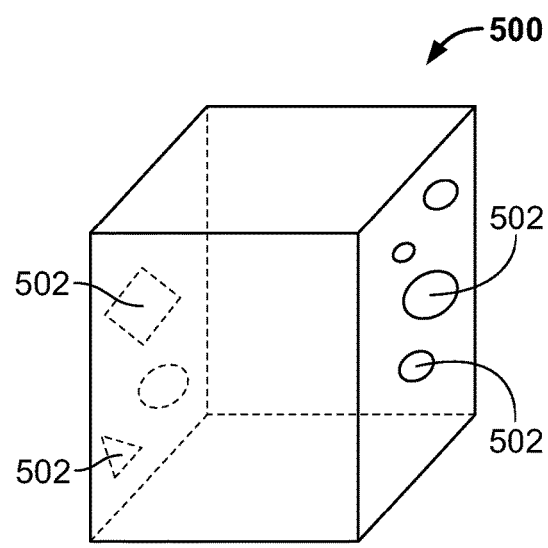
FIG. 5 is a perspective view of a rectangular shaped heat spreader according to yet another example embodiment.

For example, FIGS. 4 and 5 illustrate example heat spreaders 400, 500, respectively, that may be employed in the kamado-style grill 100 and/or another suitable grill. As shown, the heat spreader 400 of FIG. 4 is shaped as a cone and the heat spreader 500 of FIG. 5 is shaped as a cube. As such, the cross sectional shape of the heat spreader 400 has a similar shape as the cross sectional shape of a circular gas burner whereas the cross sectional shape of the heat spreader 500 has a different shape.

As shown in FIG. 5, the heat spreader 500 includes various sized and shaped perforations 502 on two of its opposing side surfaces to allow air to flow through the heat spreader 500. In particular, one of the side surfaces defines three perforations 502 (e.g., a triangular perforation, a rectangular perforation, and an oval perforation) while the other side surface defines four perforations 502 (e.g., oval perforations). Alternatively, other side surfaces (including adjacent side surfaces) of the heat spreader 500 may define the perforations 502. In other embodiments, a heat spreader may not define perforations. For example, the heat spreader 400 of FIG. 4 does not include perforations.

Figure 6:
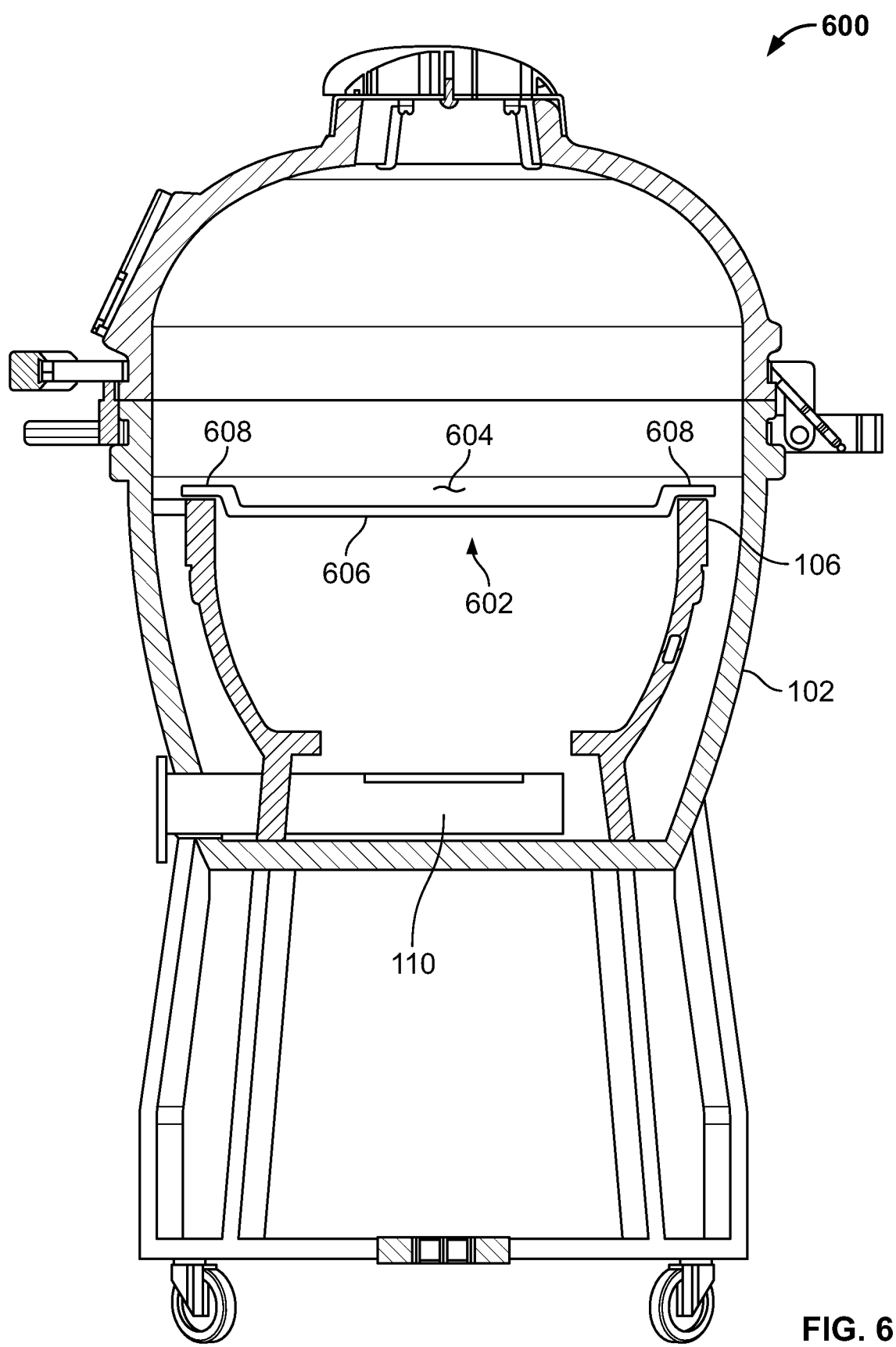
FIG. 6 is a cross sectional side view of a kamado-style grill including a support bracket for supporting a structure according to another example embodiment.

FIG. 6 illustrates another example kamado-style grill 600 substantially similar to the grill 100 of FIG. 1, but including a support bracket instead of a heat spreader. In particular, the kamado-style grill 600 includes the vessel 102, the fire bowl 106, and the unit 110 of FIG. 1, and a support bracket 602 removably coupled to the fire bowl 106. As shown in FIG. 6, the support bracket 602 extends across at least a portion of an opening 604 of the fire bowl 106 for supporting a structure (not shown).

As shown in FIG. 6, the support bracket 602 includes a transverse portion 606 and leg portions 608 on opposing ends of the transverse portion 606. In the particular example of FIG. 6, the leg portions 608 rest on a top surface of the fire bowl 106 and extend downwardly into an interior portion the fire bowl 106 through the opening 604. The transverse portion 606 extends across the opening 604 of the fire bowl 106. Put another way, the leg portions 608 are configured to allow the transverse portion 606 to extend across the opening 604 and below the top surface of the fire bowl 106. Thus, the support bracket 602 is removably coupled to the fire bowl 106 such that the support bracket 602 is positioned substantially within the fire bowl 106.

Alternatively, the leg portions 608 of the support bracket 602 may not extend downwardly into the fire bowl 106. In such examples, the transverse portion 606 extends across the opening 604 at or above the top surface of the fire bowl 106.

Additionally, the support bracket 602 may be removably coupled to the fire bowl 106 via one or more fasteners. For example, the leg portions 608 may be removably coupled to the fire bowl 106 with one or more clamps, brackets, and/or other suitable fasteners if desired.

Preferably, the support bracket 602 is removably coupled to the fire bowl 106 after the gas unit 110 and the heat spreader 112 are installed as explained above. After which, a structure (e.g., a lava stone, etc.) may be placed on the support bracket 602 as further explained below. Alternatively, the support bracket 602 may be removably coupled to the fire bowl 106 before the gas unit 110 and/or the heat spreader 112 are installed if desired.

In the particular example of FIG. 6, the support bracket 602 includes a substantially "X" shape. For example, and as shown in FIG. 7, the support bracket 602 includes four leg portions 608 and two transverse portions (e.g., cross beams, etc.) 606 extending across the opening 604 of the fire bowl 106. The transverse portions 606 intersect each other adjacent the opening 604 of the fire bowl 106 to form the substantially "X" shaped support bracket 602.

Alternatively, other suitable shaped support brackets may be utilized in the kamado-style grill 600 and/or other grills disclosed herein. For example, a support bracket may include a star shaped support bracket, a triangular shaped support bracket, a rectangular shaped support bracket, etc. FIG. 8 illustrates another example support bracket 802 employable in the kamado-style grill 600 and/or other grills disclosed herein. As shown in FIG. 8, the support bracket 802 includes two transverse portions 806 and four leg portions 808 on opposing ends of the transverse portion 806. Similar to the support bracket 602 of FIGS. 6 and 7, the support bracket 802 may be removably coupled to the fire bowl 106 by resting on the top surface of a fire bowl and/or via one or more fasteners as explained above.

In the particular example of FIG. 8, each transverse portion 806 extends in an arc between its corresponding leg portions 808. This allows the transverse portions 806 to extend near a center portion of the opening 604 of the fire bowl 106 without intersecting each other. Thus, the support bracket 802 of FIG. 8 includes a shape resembling seams on a baseball (e.g., a substantially "II" shape).

Additionally, although FIG. 6 illustrates the kamado-style grill 600 as including the gas unit 110, it should be apparent that other suitable units may be employed without departing from the scope of the disclosure. For example, the grill 600 may include a charcoal related unit, a removable charcoal related unit, a removable gas unit, etc. instead of the gas unit 110

As explained above, the support bracket (e.g., the support bracket 602 of FIGS. 6 and 7, the support bracket 802 of FIG. 8, and/or another suitable support bracket) supports a structure (e.g., a cooking surface, etc.). For example, FIG. 9 illustrates a structure 902 removably coupled to the support bracket 602 of FIGS. 6 and 7. In particular, the structure 902 rests on the transverse portions (not shown) of the support bracket 602 and the leg portions 608 of the support bracket 602 rest on the top surface of the fire bowl 106 as explained above.

The structure 902 can then be used, for example, as a cooking surface to cook desired items (e.g., a pizza as shown in FIG. 9, etc.). Additionally and/or alternatively, the structure 902 can spread heat across an opening of the kamado-style grill 600 and/or other grills disclosed herein. For example, food may be placed on a grate and/or another suitable cooking surface above the structure 902, directly on the structure 902 (e.g., as shown in FIG. 9), etc. In such examples, the structure 902 can spread heat across its surface and the grill's opening so that the food is evenly cooked.

In other examples, the structure 902 may vaporize liquids. For example, when a user cooks food with one of the grills disclosed herein, liquid from that food may drip onto the structure 902. This liquid that contacts the structure 902 may be vaporized (e.g., due to the temperature of the structure 902, etc.) and mix with the smoke within the grill. This causes the food, which is at least partially cooked by the smoke, to have enhanced flavors. Thus, the structure 902 may be used at least as a cooking surface, a heat spreader, and/or a vaporization device.

In the particular example of FIG. 9, the structure 902 includes a lava stone. The lava stone may be formed of natural volcanic rock and/or other suitable materials. Alternatively, other suitable structures may be removably coupled to the support bracket 602 and/or other the support brackets disclosed herein. For example, the structure may include a grate (e.g., a steel grate, etc.), a solid plate (e.g., a metallic plate, etc.), wood (e.g., cedar, etc.), other stones, etc.

Figure 10:
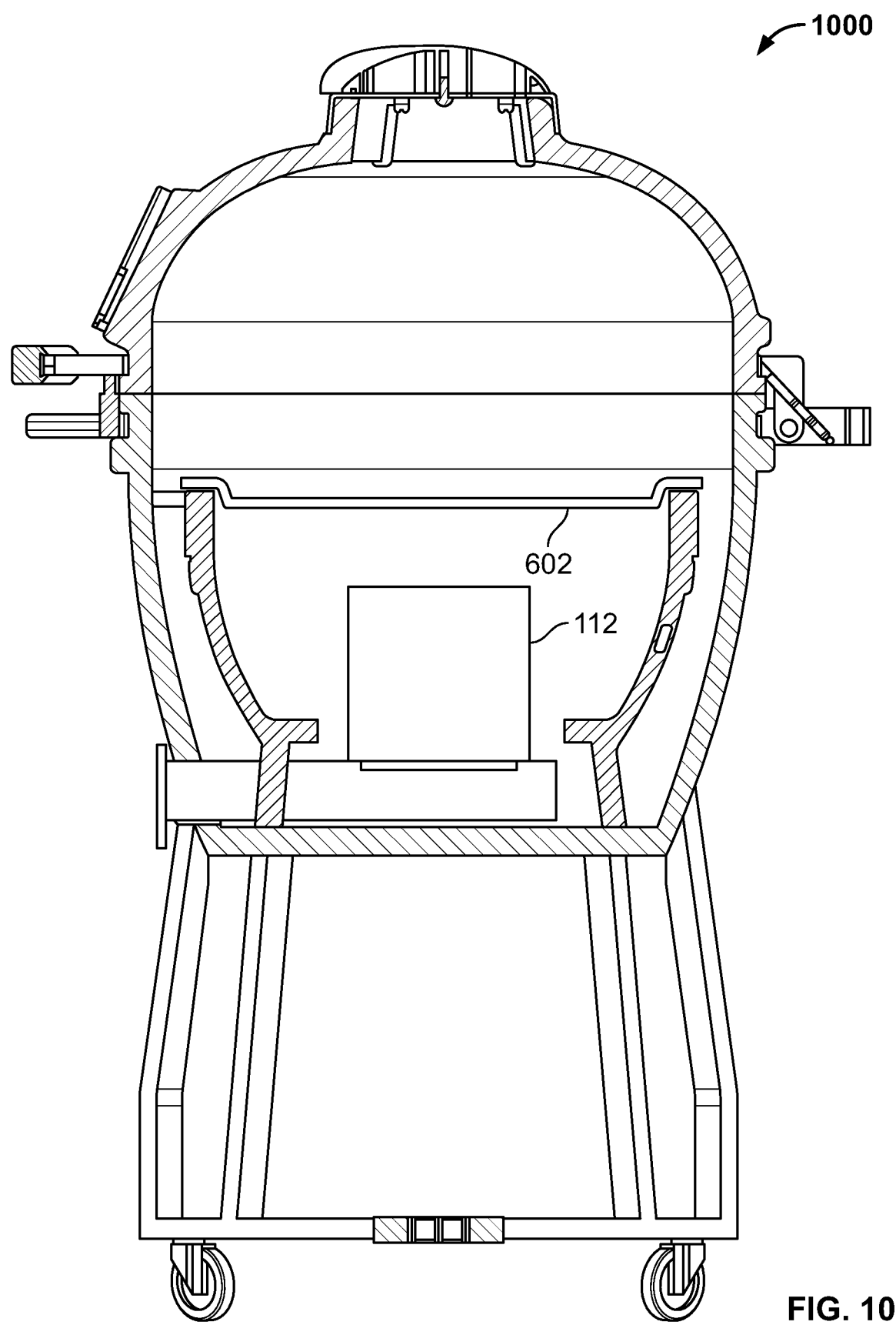
FIG. 10 is a cross sectional side view of a kamado-style grill including the heat spreader of FIG. 1 and the support bracket of FIG. 6 according to another example embodiment.

In some embodiments, the grills disclosed herein may include a heat spreader and a support bracket. For example, FIG. 10 illustrates a kamado-style grill 1000 substantially similar to the grill 100 of FIG. 1 but including the support bracket 602 of FIGS. 6 and 7 in combination with the heat spreader 112 of FIG. 1. Additionally and/or alternatively, other suitable support brackets and/or heat spreaders may be employed in the grill 1000 of FIG. 10 if desired.

The gas units (including the removable gas units, etc.) disclosed herein may include various optional components. For example, FIGS. 11 and 12 illustrate a removable gas unit 1100 including a gas burner 1114, a gas port system 1102 for receiving flammable gas, an ignition system 1104, and a housing 1118 for housing various components (e.g., conduits, etc.) of the gas burner 1114 and the systems 1102, 1104.

The housing 1118 includes a faceplate 1108, a base support 1116 removably coupled to the faceplate 1108, and a cover 1112 removably coupled to the faceplate 1108 and/or the base support 1116. As shown in FIG. 11, portions of the gas port system 1102 and the ignition system 1104 are positioned on an exterior facing side of the faceplate 1108. In particular, inputs such as gas inputs, user inputs, etc. of the systems 1102, 1104 are the positioned on the exterior side of the faceplate 1108.

Figure 11:
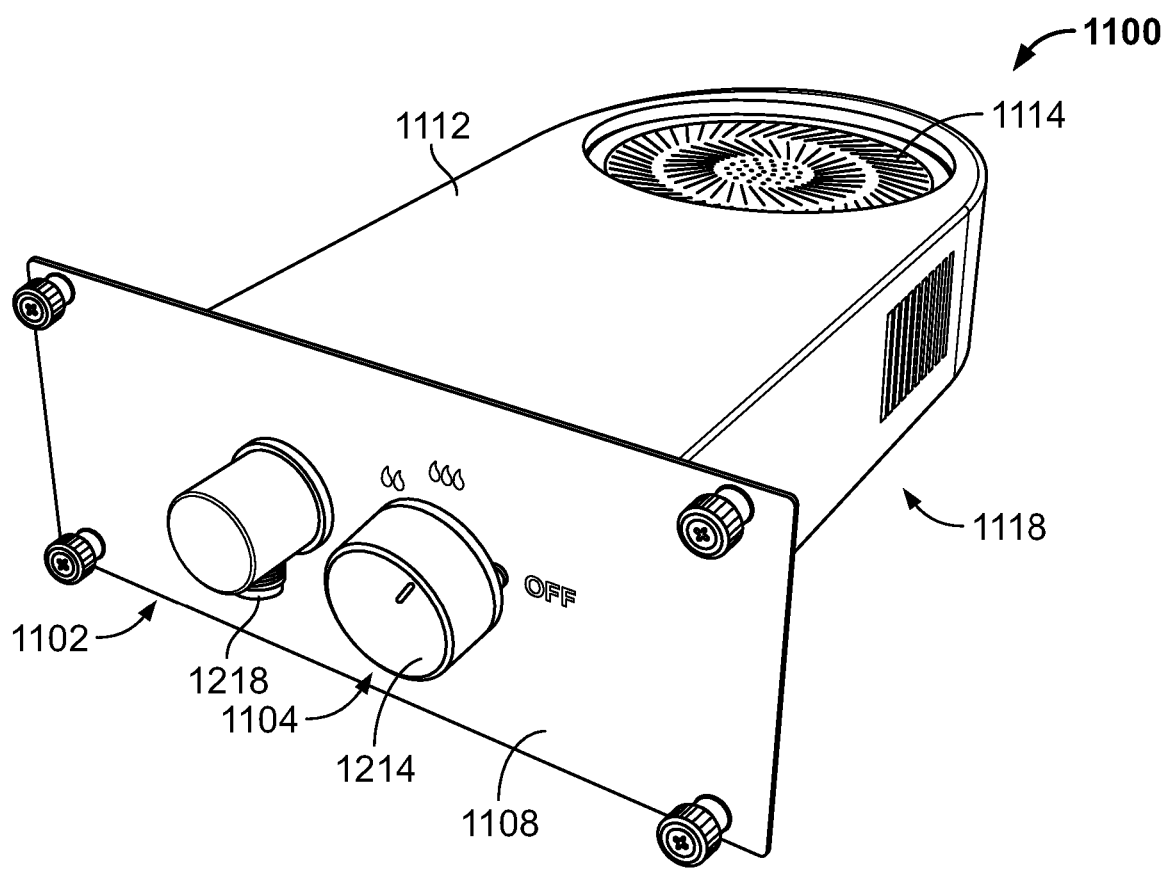
FIG. 11 is a top perspective view of a removable unit including a gas port system and an ignition system according to another example embodiment.

As shown in FIG. 11, the ignition system 1104 includes a controller 1214 including one or more user inputs to ignite the gas burner 1114, adjust an amount of flammable gas received by the gas burner, etc. For example, a user may manipulate (e.g., push, rotate, etc.) the controller 1214 to generate a spark to ignite the flammable gas. The controller 1214 may include, for example, one or more igniters such as electronic igniters which may or may not include batteries, piezo igniters, etc. that can generate the spark to ignite the flammable gas. In the particular example of FIGS. 11 and 12, the controller 1214 includes a piezo igniter.

Figure 12:
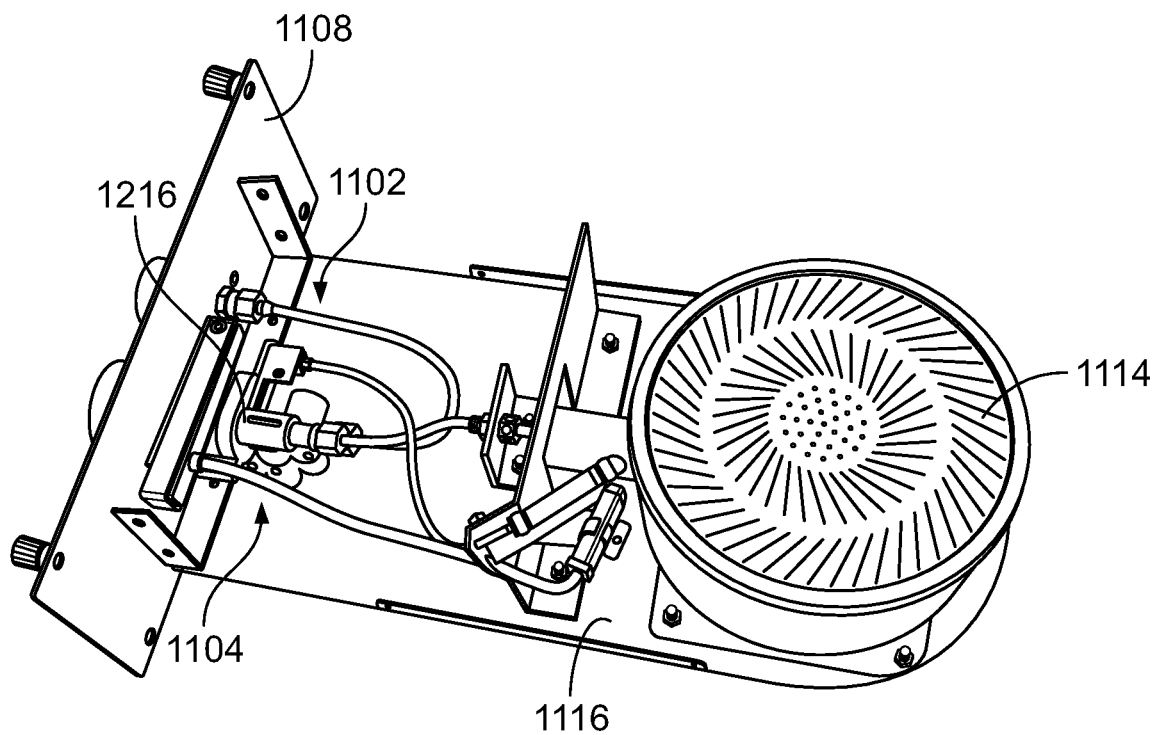
FIG. 12 is a top perspective view of the removable unit of FIG. 11 with its cover removed.

The controller 1214 of FIGS. 11 and 12 can also be used to adjust an amount of flammable gas received by the gas burner 1114. For example, a user can manipulate (e.g., push, rotate, etc.) the controller 1214 such that the amount of flammable gas from the gas port system 1102 is controlled. In the particular example of FIGS. 11 and 12, the controller 1214 is rotated to control the amount of flammable gas. The different amounts of flammable gas can be generally represented to a user by indicia such as the "OFF" label and the flame labels as shown in FIG. 11. In other embodiments, the indicia may include letters, words, phrases, etc. For example, the indicia may include the word "HIGH", "MEDIUM", "MED", and/or "LOW", etc.

The indicia disclosed herein may represent discrete positions for a particular amount of flammable gas. For example, the indicia may include a low position, a high position, and an off position representing the only three levels of flammable gas available to a user. In other examples, the indicia may represent one or more positions on an analog scale ranging from no flammable gas to a particular amount of flammable gas.

Additionally, the ignition system 1104 may include a device that allows the flow of flammable gas from the gas port system 1102 after the flammable gas is ignited. For example, and in the particular example of FIG. 12, the ignition system 1104 includes a thermocouple 1216 coupled between the gas port system 1102 and the gas burner 1114. The thermocouple 1216 is latchable to allow flammable gas to flow to the gas burner 1114 when the controller 1214 is actuated. For example, the thermocouple 1216 may latch in response to a user manipulating the controller 1214 to ignite the gas burner 1114 and after an internal temperature (e.g., of the thermocouple 1216) reaches a defined value, after a defined period of time (e.g., 0.5 seconds, 1.5 seconds, 3 seconds, 5 seconds, etc.), etc. The thermocouple 1216 may unlatch after a temperature (e.g., of the thermocouple 1216, adjacent the gas burner 1114, etc.) is equal to, below, or above a defined value. For example, the thermocouple 1216 may unlatch based on a sensed temperature thereby blocking flammable gas from passing through conduits in the housing 1118 and to the gas burner 1114 when a flame from the gas burner 1114 is extinguished, reduces below a undesirable level, etc.

As shown in FIG. 11, the gas port system 1102 includes an input gas port 1218 that is removably coupled to a source of flammable gas. The input gas port 1218 may be shaped, sized, etc. to mate with conventional sources of flammable gas. For example, the gas port 1218 may include one or more conventional couplings for attaching the gas source to the removable unit 1100 via a hose or the like. In some embodiments, the input gas port 1218 may include one or more quick connect/disconnect couplings if desired. Although not shown, the gas port system 1102 may include a shutoff valve (e.g., an emergency shutoff valve, etc.) to prohibit the fuel from reaching the gas burner 1114.

In some embodiments, the functions of the controller 1214 may be performed by different user input components. In such cases, one component can be manipulated to adjust an amount of flammable gas received by the gas burner 1114 and another component can be manipulated to ignite the gas burner 1114.

Figure 13:
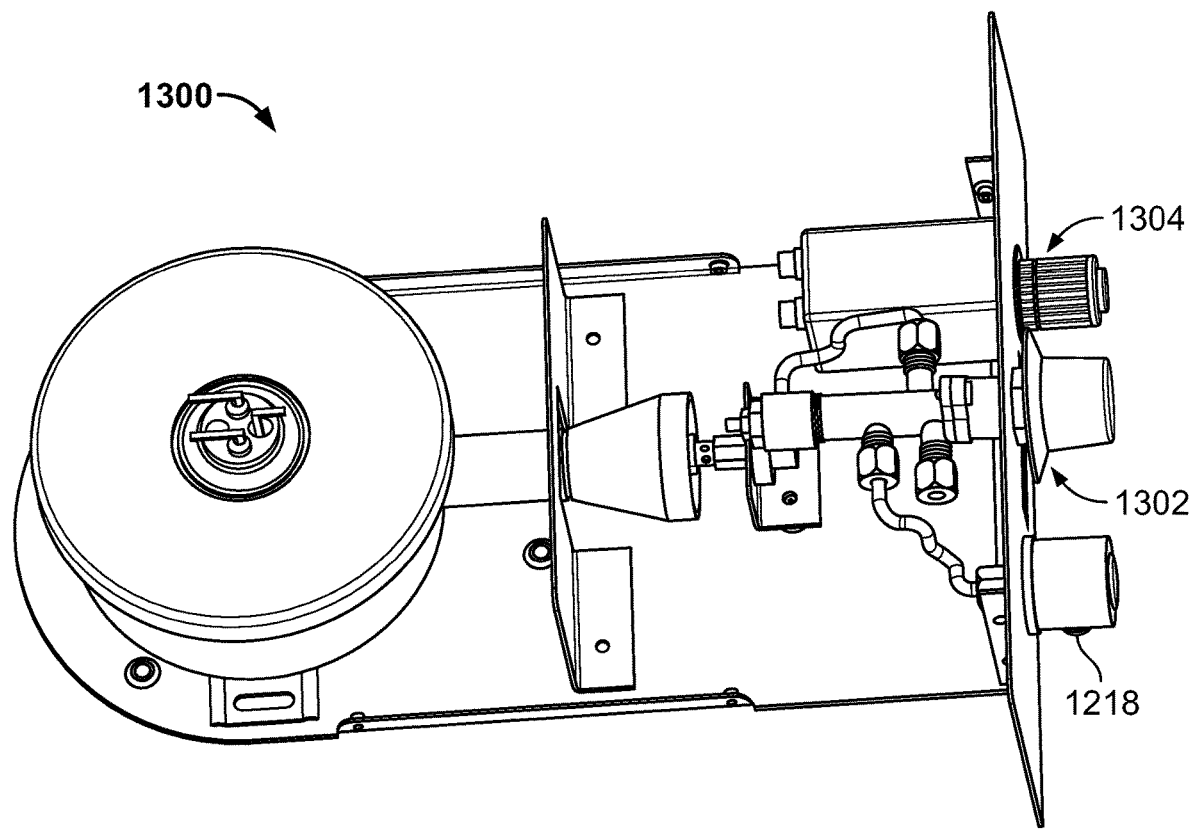
FIG. 13 is a top perspective view of a removable unit including an open flame burner according to another example embodiment.

For example FIG. 13 illustrates an example removable gas unit 1300 substantially similar to the removable gas unit 1110 of FIGS. 11 and 12. The removable gas unit 1300 includes a gas port system having the input gas port 1218 of FIG. 11, and a gas control system 1302 and an ignition system 1304. Similar to the controller 1214 of FIG. 12, the gas control system 1302 of FIG. 13 may include a rotatable user input to control an amount of flammable gas. The ignition system 1304 includes a user input (e.g., a push bottom) to generate a spark to ignite the flammable gas from the gas port system. In the particular example of FIG. 13, the ignition system 1304 includes an electronic igniter.

As explained above, a vessel may receive more than one removable unit. For example, one removable unit (e.g., the removable gas unit 110, 210, 1100, 1300) may be removed, and another removable unit may be inserted into the vessel as explained above. The other removable unit may be, for example, an unit including a receptacle for collecting ashes from burnt charcoal, one or more vents to allow air to flow through the kamado-style grill, opening(s) for receiving a fire starter, etc. For example, FIGS. 14 and 15 illustrate removable units 1400, 1500 (sometimes referred to as removable charcoal units) insertable through an opening of a vessel for positioning below a fire bowl opening, as explained above.

Figure 14:
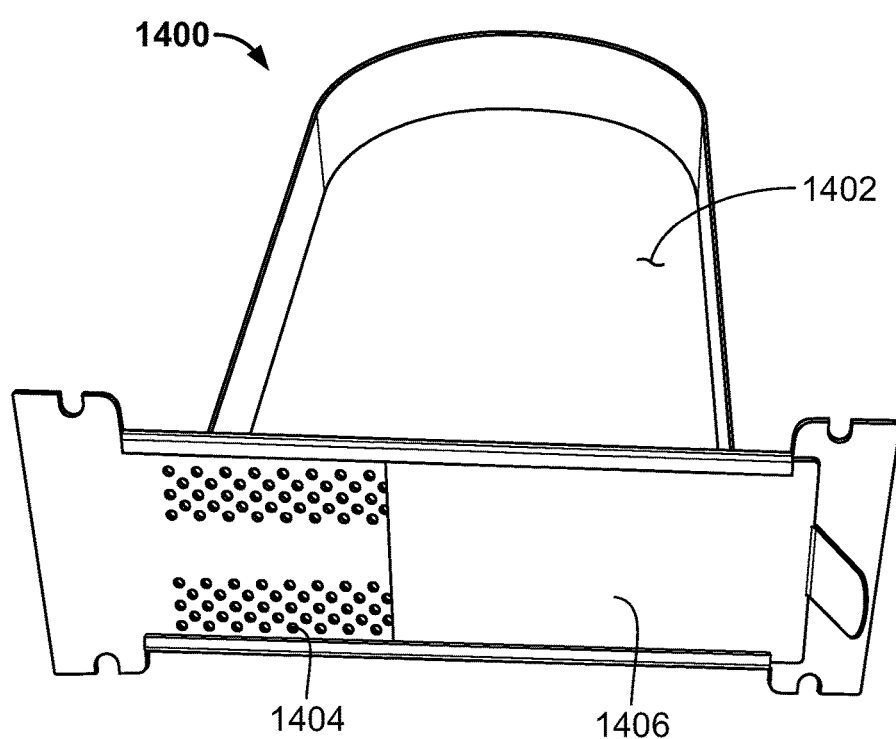
FIG. 14 is a top perspective view of a removable unit including an ash receptacle, vents and a slidable vent cover according to yet another example embodiment.

As shown in the FIG. 14, the removable charcoal unit 1400 includes a receptacle 1402, a vent (e.g., perforations 1404), and a vent cover 1406 for controlling the amount of air passing through the perforations 1404. In the particular example of FIG. 14, the vent cover 1406 is slidable to alter the number of perforations 1404 covered by the vent cover 1406.

Figure 15:
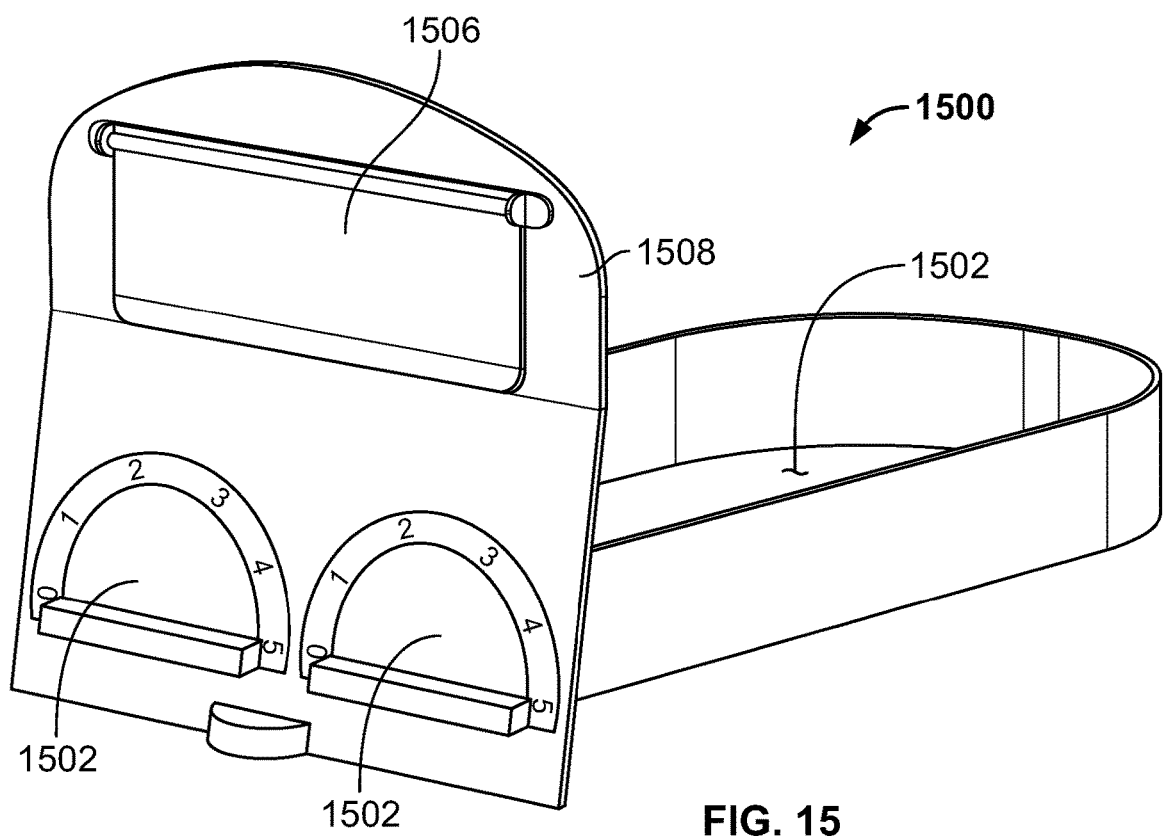
FIG. 15 is a perspective view of a removable unit including an ash receptacle and rotatable vent covers according to another example embodiment.

The removable charcoal unit 1500 of FIG. 15 includes a receptacle 1502, two vent covers 1504 for controlling the amount of air passing through vents (not shown), and a movable cover 1506 that covers an opening (not shown) for receiving a fire starter. In the particular example of FIG. 15, the vent covers 1504 are rotatable to alter the amount of area of the vents covered by the vent covers 1504. Additionally, the cover 1506 is pivotably coupled via one or more hinges to a faceplate 1508 of the unit 1500 to allow the cover 1506 to move thereby exposing the fire starter opening.

Although FIGS. 11-15 illustrate removable units each including specific components (e.g., the user inputs, controls, vents, etc.) at specific locations, it should be apparent that any one of the removable units may have more or less components including components of another removable unit. Additionally, the components of any one of the removable units may be positioned at any suitable location. For example, the removable gas unit 1110 of FIGS. 11 and 12 may include a push bottom ignition system (e.g., similar to the ignition system 1304 of FIG. 13) to generate a spark to ignite the flammable gas from the gas port system. This push bottom ignition system can be positioned adjacent to the input gas port 1218, the controller 1214, etc.

The kamado-style grills disclosed herein may include various different optional features. For example, one or more of the kamado-style grills may include a lid coupled (e.g., detachably coupled, pivotably coupled, etc.) to a vessel. In some embodiments, the lid may include an optional vent system positioned adjacent a top of the kamado-style grills.

For example, and as shown in FIG. 1, the grill 100 includes a lid 116 coupled to the vessel 102 and a vent system 118 coupled to a top portion of the lid 116. In the particular example of FIG. 1, the lid 116 is pivotably coupled to the vessel 102 via one or more hinges 120. The vent system 118 includes one or more vents (e.g., openings, etc.) 122 to allow air, smoke, etc. to exhaust from the interior of the grill 100 and a vent cover 124 movable relative to the vent(s) for controlling the amount of air, smoke, etc. flowing through (and out of) the grill 100. The vent system 118 may work in conjunction with, for example, vent(s) of the charcoal units 1400, 1500 of FIGS. 14 and 15.

Figure 16:
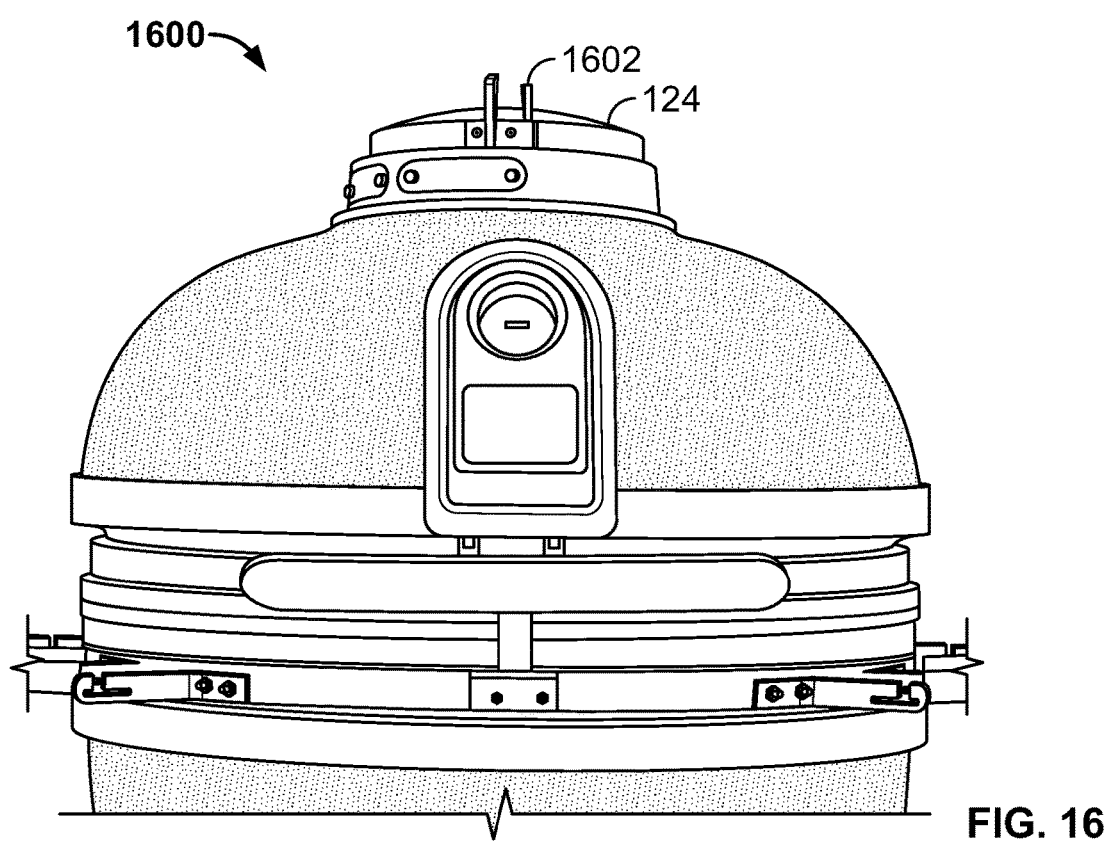
FIG. 16 is a front view of a kamado-style grill including a vent cover and a vent lock for locking the vent according to yet another example embodiment.

In some embodiments, the vent cover may be locked in a particular position. For example, FIG. 16 illustrates a portion of a kamado-style grill 1600 substantially similar to the kamado-style grill 100 of FIG. 1. The grill 1600, however, includes a vent lock 1602 detachably coupled to the vent cover 124. When employed, the vent lock 1602 substantially prevents the vent cover 124 from moving relative to the vent(s) (not shown in FIG. 16). In some circumstances, it may be desired to keep the vents at least partially open, closed, etc. For example, if a removable gas unit is employed, it may be desired to keep the vents at least partially open in case a flame is extinguished and flammable gas continues to flow out of its gas burner. This may ensure the flammable gas can flow out of the kamado-style grill 1600.

Figure 17:
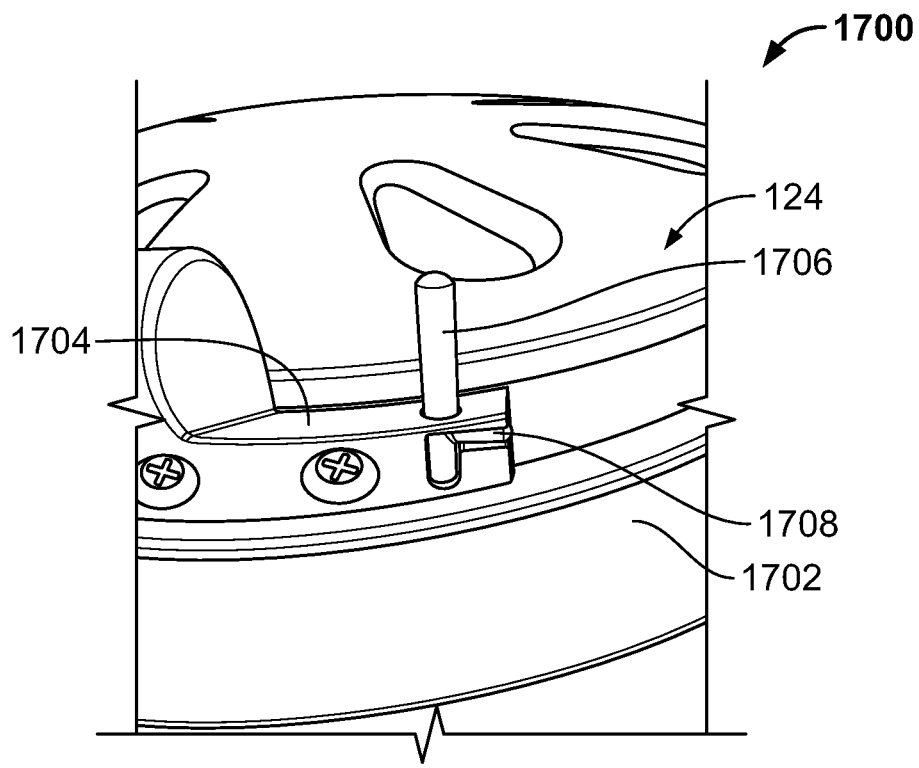
FIG. 17 is a zoomed in front perspective view of a vent cover and a vent lock including a removable pin according to another example embodiment.

The vent lock 1602 may include various different suitable devices that substantially prevent the vent cover 124 from moving. For example, FIG. 17 illustrates a vent system 1700 substantially similar to the vent system 118 of FIG. 1. The vent system 1700 includes a vent lock, a static platform 1702 that defines vent(s) (not shown in FIG. 17), and the vent cover 124 of FIG. 1 rotatably coupled to the platform 1702. In the particular example of FIG. 17, the vent lock includes a plate 1704 coupled to the vent cover 124 and defining an opening, and a pin 1706 slidable through the plate opening and removably coupled to the platform 1702 to substantially prevent the vent cover 124 from rotating relative to the vent(s). For example, the pin 1706 may be removably coupled to the platform 1702 by positioning the pin in an opening defined by the platform 1702. Alternatively, other suitable vent locks may be employed without departing from the scope of the disclosure.

As shown in FIG. 17, the pin 1706 can include a protruding member 1708. In such examples, the plate 1704 includes a cutout or the like that corresponds to the protruding member 1708. As such, if it is desired to prevent the vent cover 124 from moving, a user can rotate the pin 1706 such that the protruding member 1708 rotates away from the cutout to allow the pin 1706 to fall into the opening defined by the platform 1702. If it is desired to allow the vent cover 124 to move, a user can manipulate the pin 1706 such that the protruding member 1708 is adjacent the cutout of the plate 1704, as shown in FIG. 17.

Additionally and/or alternatively, the kamado-style grills disclosed herein may include an optional support frame for supporting the vessel, the fire bowl, and/or the lid. For example, the grill 100 of FIG. 1 includes a support frame 126 includes four legs 128 and wheels 130 (e.g., casters, etc.) coupled to the legs 128. As such, the grill 100 can be supported by the support frame 126 and be moved as desired.

Figure 18:
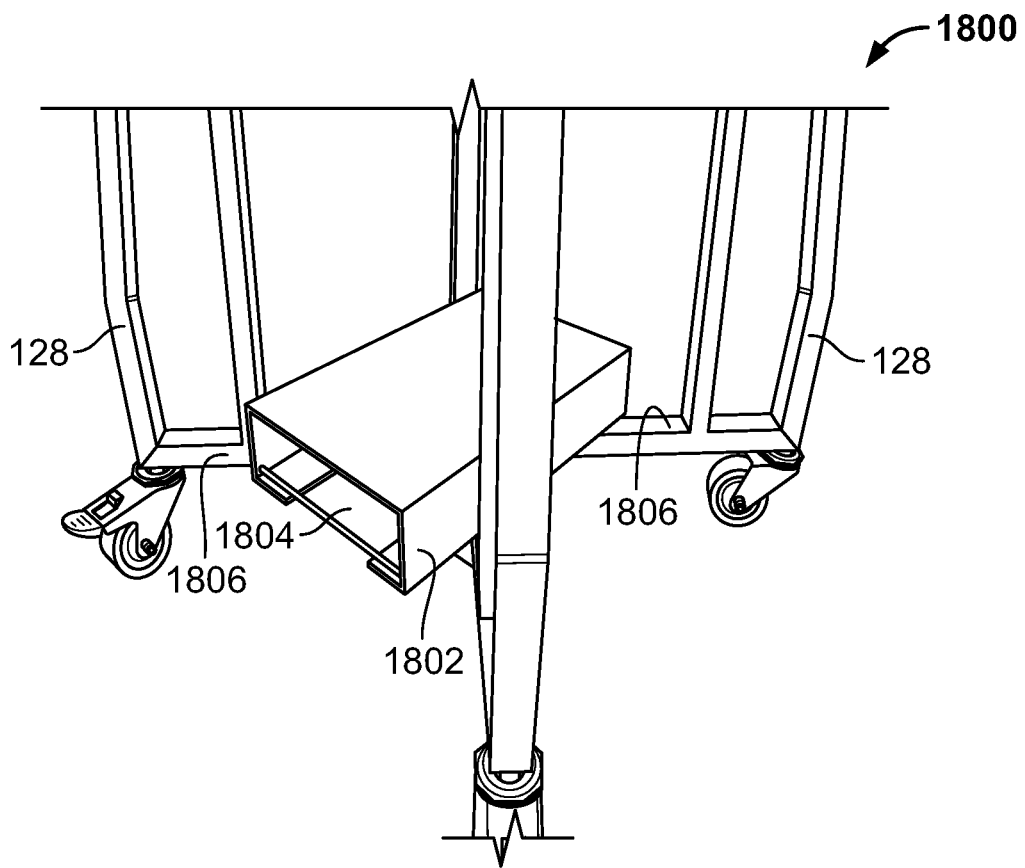
FIG. 18 is a perspective view of a support frame of a kamado-style grill and a removable unit sleeve coupled to the support frame according to another example embodiment.

In some embodiments, the grills may include a sleeve for receiving a removable unit (e.g., one of the removable unit disclosed herein, etc.). For example, FIG. 18 illustrates a support frame 1800 of a kamado-style grill substantially similar to the support frame 126 of FIG. 1, but including a sleeve 1802 coupled to the support frame 1800. As shown, the sleeve 1802 defines an opening 1804 for receiving a removable unit. This allows a user to store the removable unit in the sleeve 1802 and use another removable unit for cooking purposes (if desired), as explained above. Thus, the sleeve 1802 can store the non-used removable unit when the other removable unit is inserted into the vessel.

Figure 19:
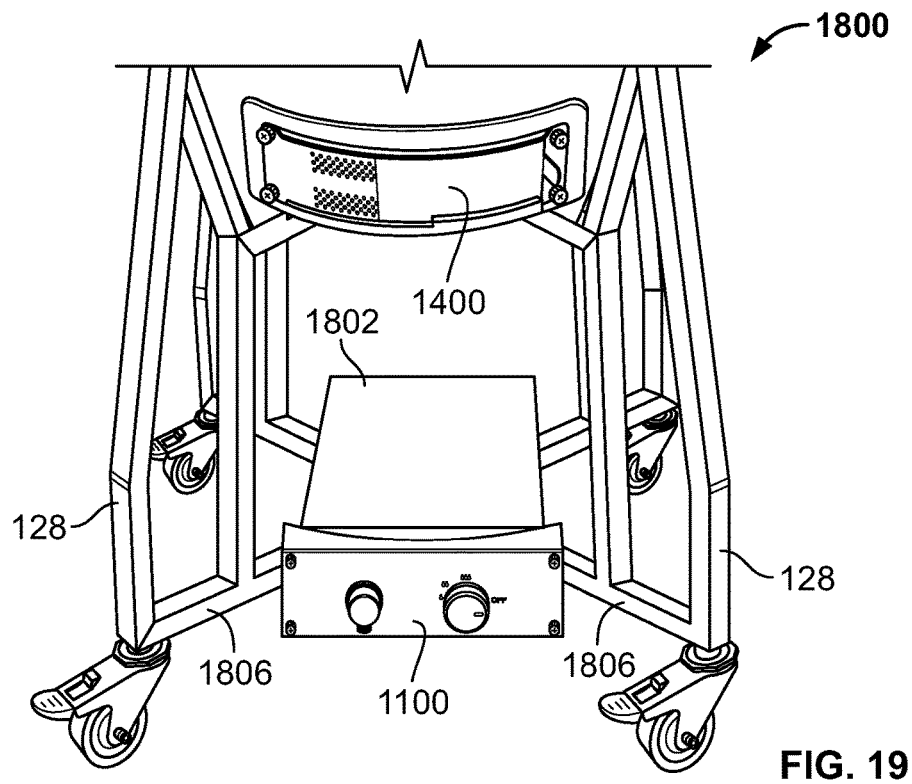
FIG. 19 is a front view of the support frame and sleeve of FIG. 18, where the sleeve is storing a removable gas unit.
Figure 20:
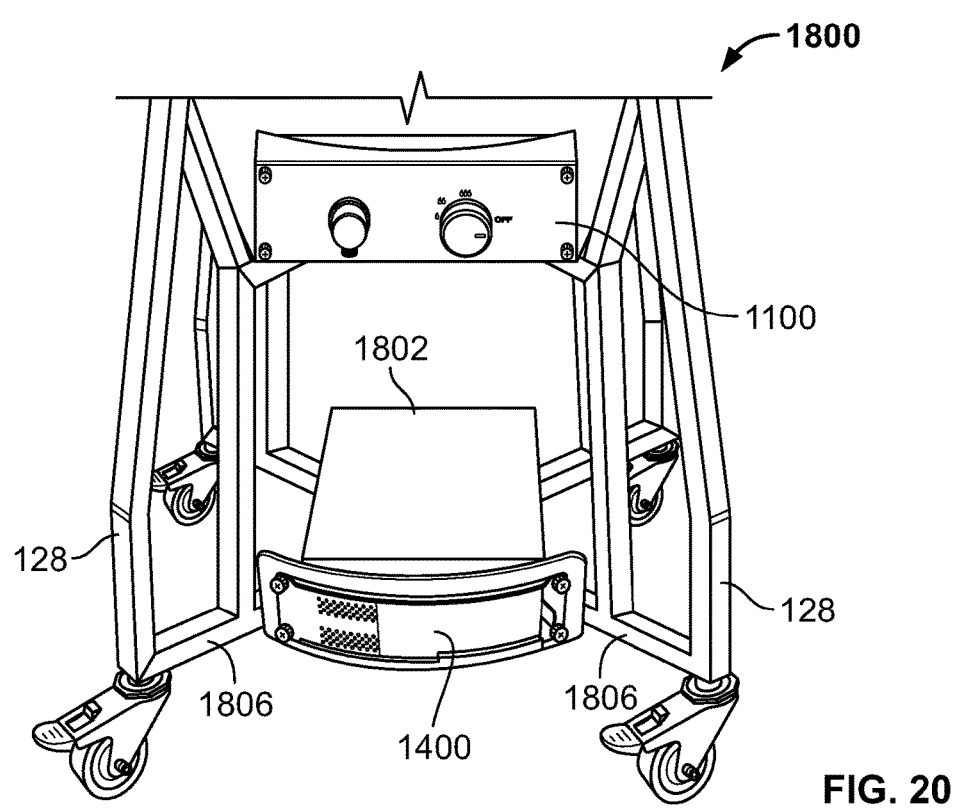
FIG. 20 is a front view of the support frame and sleeve of FIG. 18, where the sleeve is storing a removable charcoal unit.

For example, and as shown in FIG. 19, the removable gas unit 1110 of FIGS. 11 and 12 is positioned in the sleeve 1802 via its opening (not shown), and the removable charcoal unit 1400 of FIG. 14 is inserted in the vessel, as explained above. In other examples, the removable charcoal unit 1400 is positioned in the sleeve 1802, and the removable gas unit 1110 is inserted in the vessel, as shown in FIG. 20. Alternatively, other suitable removable units may be used if desired.

The support frame 1800 includes a base 1806 and the legs 128 extending between the base 1806 and a vessel. As shown in FIGS. 18-20, the sleeve 1802 is coupled to the base 1806 between the legs 128. As such, the sleeve 1802 is coupled to the support frame 1800 such that the opening 1804 extends in a substantially parallel direction relative to the ground supporting the grill. Alternatively, the sleeve 1802 may be coupled to the legs 128 and/or another suitable structure of the support frame 1800, grill, etc., and/or be orientated in another suitable manner (e.g., substantially perpendicular position relative to the ground, etc.).

Figure 21:
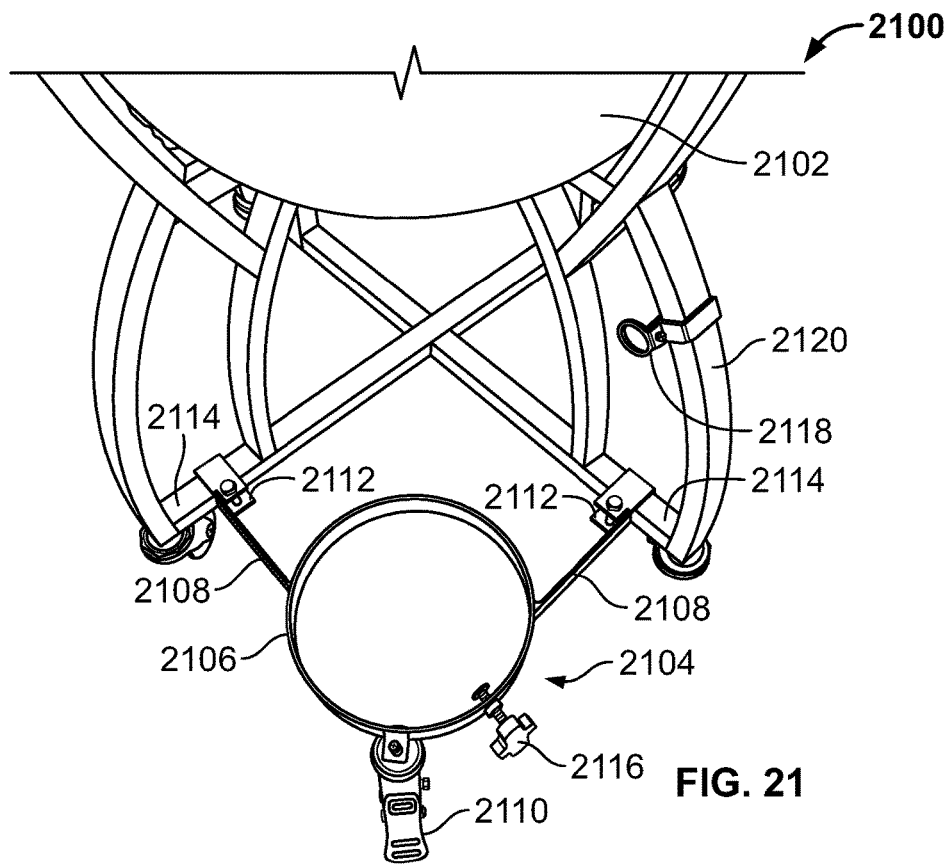
FIG. 21 is a perspective top view of a support frame and a gas source cart coupled to the support frame according to another example embodiment.
Figure 22:
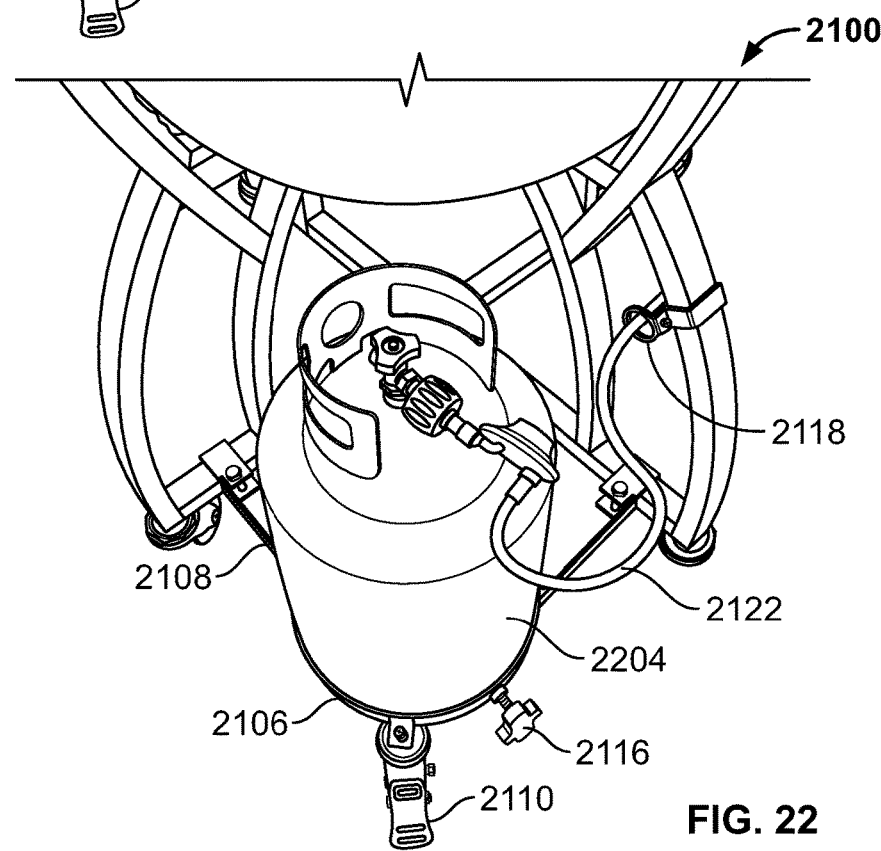
FIG. 22 is a perspective top view of the support frame and the cart of FIG. 21 with a gas source coupled to the cart.

Additionally and/or alternatively, the kamado-style grills may include an optional cart to support a gas source coupled (e.g., detachably coupled, etc.) to the support frame. For example, FIGS. 21 and 22 illustrate a support frame 2100 for supporting a vessel 2102 of a kamado-style grill, and a cart 2104 coupled to the support frame 2100. The cart 2104 may be coupled to the support frame 2100 via any suitable device, process, etc. For example, the cart 2104 may be welded to the frame 2100, coupled to the frame 2100 via one or more fastening devices (as shown in FIGS. 21 and 22), etc.

In the particular example of FIGS. 21 and 22, the cart 2104 includes a frame 2106 for supporting a gas source 2204, two bars 2108 extending between the frame 2106 and the support frame 2100, a wheel 2110 (e.g., a caster, etc.) coupled to the frame 2106, and mechanical fasteners 2112 for coupling the bars 2108 (and therefore the cart 2104) to the support frame 2100. The mechanical fasteners 2112 include a bracket that corresponds (e.g., shape, size, etc.) to a base 2114 of the support frame 2100 and a fastening device (e.g., a screw, a nut, a pin, etc.) for detachably coupling the bracket to the base 2114. As such, the cart 2104 may be coupled to the support frame 2100 via the mechanical fasteners 2112 such that the cart 2104 is attached to the kamado-style grill when the grill is used as a gas fired grill and detached from the kamado-style grill when the grill is used as a charcoal fired grill.

The frame 2106 may include an "I" shaped support formed into a substantially circular shape corresponding to a cross sectional shape of the gas source 2204. For example, the inner circumference of the frame 2106 may be slightly larger than an outer circumference of a portion of the gas source 2204 such that this portion of the gas source is able to extend into the circular shaped support when the gas source is coupled to the frame 2106. Although not shown, the frame 2106 may include one or more cross beams extending across the circular shaped support to provide additional stability, support, etc. Alternatively, other suitable supports formed into a different shape may be employed if desired.

As shown in FIG. 22, the gas source 2204 is coupled to the frame 2106 by resting on top of the support (and cross beams if employed), by manipulating one or more mechanical fasteners (e.g., screws, bolts, pins, nuts, etc.), etc. For example, the frame 2106 of FIGS. 21 and 22 includes a mechanical fastener 2116 that detachably couples the gas source 2204 to the cart 2104. In the particular example of FIGS. 21 and 22, the mechanical fastener 2116 includes a bolt and a rotatable knob coupled to the bolt allowing a user to rotate the bolt. The bolt can be rotated a desired amount such that the bolt is pressed against the gas source thereby securing the gas source in place.

In other embodiments, the frame 2106 may be adjustable. For example, one or more mechanical fasteners may be manipulated to reduce and/or increase the size of the circular shaped support to accommodate various sized gas sources. Additionally and/or alternatively, one or more mechanical fasteners may be employed to change the shape of the frame 2106 to accommodate various shaped gas sources.

As shown in FIG. 22, the gas source 2204 may be detachably coupled to a gas unit (if employed) via a flexible hose 2122 as explained above. Alternatively, one or more other suitable conduits including other types of flexible hoses may be employed.

If desired, the hose 2122 can be secured to one or more legs 2120 of the support frame 2100 to ensure the hose does not interfere with the wheels of the kamado-style grill and/or the wheel 2110 of the cart 2104. For example, one or more routing devices 2118 may be coupled to the support frame 2100. As shown best in FIG. 21, the routing device 2118 includes a bracket coupled to one leg 2120 and a circular support coupled to the bracket. The hose 2122 can pass through the circular support of each routing device 2118 thereby securing the hose 2122 to the support frame 2100. Alternatively, other suitable devices such as clamps, etc. may be employed to secure the hose 2122 to the support frame 2100 and/or route the hose 2122 to the gas unit.

Preferably, the cart 2104 is coupled to the support frame 2100 and the gas source 2204 is coupled to the gas unit after the heat spreader 112 (if used) and the structure 902 (if used) are installed, as explained above. In other embodiments, the cart 2104 may be coupled to the support frame 2100 and/or the gas source 2204 may be coupled to the gas unit before or after the gas unit is installed (as explained above), before the heat spreader 112 and/or the structure 902 are installed (as explained above), etc. if desired.

The grills disclosed herein are kamado-style grills. As such, one or more components of the grills such as the vessels, the fire bowls, and/or the lids disclosed herein may include one or more earthen materials (e.g., clay, ceramics, etc.). In some embodiments, these component(s) do not include steel or other metallic materials commonly used in conventional grills such as kettle-style grills.

The burner of the gas units (including the removable gas units, etc.) disclosed herein may include various different types of burners. For example, the gas units may include an infrared burner as shown in FIGS. 11 and 12, an open flame burner (or the like) as shown in FIG. 14, etc.

The flammable gas disclosed herein may include any suitable combustible gas, a combination of combustible gases, a combination of combustible gases and noncombustible gases, etc. For example, the gas may include natural gas, propane and/or another suitable gas. The flammable gas may be provided via a gas source such as a refillable tank (e.g., a propane tank), a gas line from a home gas system, etc.

Additionally, the charcoal disclosed herein may include any suitable material. For example, the charcoal may include lump charcoal, charcoal briquettes, wood, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A grill assembly comprising: a vessel defining an opening extending between an interior of the vessel and an exterior of the vessel; a fire bowl adapted to be positioned within the vessel, the fire bowl defining an upper opening and a lower opening; a unit sized to extend through the opening of the vessel and below the lower opening of the fire bowl, the unit including a burner configured to radiate heat into the fire bowl; and a heat spreader formed at least partially of a thermally conductive material to absorb heat radiated from the burner and spread heat away from the burner; and a support bracket adapted to be coupled to the fire bowl the support bracket sized to extend across at least a portion of the upper opening of the fire bowl, a natural stone adapted to be supported on the bracket above the upper opening of the fire bowl wherein the natural stone has a dimension greater than a distance across the lower opening of the fire bowl, wherein the heat spreader is sized to be positioned on the unit through the lower opening of the fire bowl.

2. The grill assembly of claim 1 wherein the heat spreader is substantially aligned with the burner when positioned on the unit to substantially shield the burner from undesirable materials.

3. The grill assembly of claim 2 wherein the heat spreader includes a top surface and a side surface extending from the top surface and wherein the side surface defines one or more perforations.

4. The grill assembly of any claim 1 wherein the unit includes an ignition system having a controller to ignite the burner.

5. The grill assembly of claim 1 wherein the burner is a gas burner and the grill assembly further comprises a cart configured to support a gas source detachably coupled to the unit.

6. The grill assembly of claim 1 wherein the unit is a first removable unit, wherein the opening of the vessel is configured to receive the first removable unit and a second removable unit when the first removable unit is removed from the vessel, and wherein the grill assembly is configured to operate as a gas fired grill when the first removable unit is inserted in the opening of the vessel and a charcoal fired grill when the second removable unit is inserted in the opening of the vessel.

7. The grill assembly of claim 6 further comprising a support frame configured to support the vessel and a sleeve coupled to the support frame, the sleeve configured to receive one of the first removable unit and the second removable unit.

8. The grill assembly of claim 1 further comprising one or more vents to allow air to flow through the grill assembly, at least one vent cover movable relative to the one or more vents, and a vent lock detachably coupled to the at least one vent cover, the vent lock configured to substantially prevent the vent cover from moving relative to the one or more vents.

9. A grill assembly comprising: a vessel defining an opening extending between an interior of the vessel and an exterior of the vessel; a fire bowl adapted to be positioned within the vessel, the fire bowl defining an upper opening and a lower opening; a unit sized to extend through the opening of the vessel and below the lower opening of the fire bowl; and a support bracket sized to be coupled to the fire bowl and to extend across at least a portion of the upper opening of the fire bowl; a natural stone adapted to be supported on the bracket above the upper opening of the fire bowl, wherein the natural stone has a dimension greater than a distance across the lower opening of the fire bowl.

10. The grill assembly of claim 9 wherein the support bracket includes a substantially X shape.

11. The grill assembly of claim 9 wherein the burner is configured to align with the lower opening of the fire bowl, the grill assembly further comprising a heat spreader adapted to substantially align with the burner when positioned on the unit to shield the burner from undesirable materials.

12. The grill assembly of claim 9 wherein the unit includes an ignition system having a controller to ignite the burner.

13. The grill assembly of claim 9 wherein the burner is a gas burner and the grill assembly further comprises a cart configured to support a gas source detachably coupled to the unit.

14. The grill assembly of claim 9 wherein the unit is a first removable unit, wherein the opening of the vessel is configured to receive the first removable unit and a second removable unit when the first removable unit is removed from the vessel, and wherein the grill assembly is configured to operate as a gas fired grill when the first removable unit is inserted in the opening of the vessel and a charcoal fired grill when the second removable unit is inserted in the opening of the vessel.

15. The grill assembly of claim 14 further comprising a support frame configured to support the vessel and a sleeve coupled to the support frame, the sleeve configured to receive one of the first removable unit and the second removable unit.

16. The grill assembly of claim 9 further comprising one or more vents to allow air to flow through the grill assembly, at least one vent cover movable relative to the one or more vents, and a vent lock detachably coupled to the at least one vent cover, the vent lock configured to substantially prevent the vent cover from moving relative to the one or more vents.

17. The grill assembly of claim 1 wherein the burner is a gas burner.

18. The grill assembly of claim 9 wherein the burner is a gas burner.

19. The grill assembly of claim 1, wherein the heat spreader comprises a perforated cylindrical side wall and an unperforated flat top surface.

20. The grill assembly of claim 19 wherein the burner is a gas burner.

21. A combination for use with a grill, the grill comprising an upper shell and a lower shell, the lower shell defining an opening therethrough, and the upper shell and the lower shell together defining a cooking chamber, the combination comprising: a unit comprising a burner configured to radiate heat into the cooking chamber and wherein the unit is sized to extend through the opening in the lower shell; and a heat spreader comprising a perforated cylindrical side wall and an unperforated flat top surface, wherein the heat spreader is sized to be positioned on the unit and a support bracket adapted to support a natural stone, the natural stone being adapted to be supported on the bracket above the heat spreader.

22. The grill assembly of claim 20 wherein the burner is a gas burner.

23. The grill assembly of claim 1, wherein the natural stone comprises a lava stone.

24. The grill assembly of claim 9, wherein the natural stone comprises a lava stone.

25. The combination of claim 21, wherein the natural stone comprises a lava stone.

* * * * *